United States Patent
Børsting et al.

(10) Patent No.: US 8,808,794 B2
(45) Date of Patent: Aug. 19, 2014

(54) METHOD OF APPLYING GELCOAT AND AN ARRANGEMENT PERFORMING SAID METHOD

(75) Inventors: Dennis A. Børsting, Kolding (DK); Qinyin Zhou, Årslev (DK); Jacobus Johannes Van Der Zee, Kolding (DK); Rajkumar Rajamani, Tamilnadu (IN)

(73) Assignee: LM Glasfiber A/S, Kolding (DK)

( * ) Notice: Subject to any disclaimer, the term of this patent is extended or adjusted under 35 U.S.C. 154(b) by 451 days.

(21) Appl. No.: 13/128,863

(22) PCT Filed: Nov. 11, 2009

(86) PCT No.: PCT/EP2009/064994
§ 371 (c)(1),
(2), (4) Date: Aug. 1, 2011

(87) PCT Pub. No.: WO2010/055061
PCT Pub. Date: May 20, 2010

(65) Prior Publication Data
US 2012/0021131 A1    Jan. 26, 2012

(30) Foreign Application Priority Data
Nov. 12, 2008 (DK) .................... PA 2008 01564

(51) Int. Cl.
| | |
|---|---|
| *B28B 7/38* | (2006.01) |
| *B22C 3/00* | (2006.01) |
| *B65B 33/00* | (2006.01) |
| *B05D 1/32* | (2006.01) |
| *B29C 37/00* | (2006.01) |
| *B29C 70/54* | (2006.01) |

(52) U.S. Cl.
CPC ............. *B29C 37/0032* (2013.01); *B29C 70/54* (2013.01)
USPC ............ 427/133; 427/135; 427/155; 427/156

(58) Field of Classification Search
CPC  B29C 37/0028; B29C 37/0032; B29C 44/14; B29C 44/32; B29C 70/088; B29C 70/44; B29C 70/54; B29C 70/542; B29C 70/543; B29C 70/545

USPC ......... 264/308, 309, 401, 402, 403, 404, 463; 427/133, 135, 155, 156, 294, 296, 401
See application file for complete search history.

(56) References Cited

U.S. PATENT DOCUMENTS 3,994,763 A * 11/1976 Sheath et al. ................ 156/182
5,213,747 A    5/1993 Lippert
(Continued)

FOREIGN PATENT DOCUMENTS

| | | |
|---|---|---|
| FR | 2704477 A1 | 11/1994 |
| WO | 83/03220 A1 | 9/1983 |

OTHER PUBLICATIONS

International Search Report and Written Opinion received for PCT Patent Application No. PCT/EP2009/064994, mailed on May 4, 2010, 8 pages.

*Primary Examiner* — Michael Wieczorek
(74) *Attorney, Agent, or Firm* — Nath, Goldberg & Meyer; Jerald L. Meyer; Sanjana Mangalagiri

(57) ABSTRACT

The present invention relates in general to a method of manufacturing fibre-reinforced parts for a wind power plant, such as a blade, in an open mould. More specifically the invention relates to a process step of applying at least one layer of gelcoat on a interior surface of said open mould prior to arranging at least one layer of material comprising fibre and to an arrangement that can be used in performing said method. The process step comprises to apply the gelcoat from a first end portion of the mould and to a second end portion of the mould and to cover the open mould from said first end portion to said second end portion gradually as gelcoat is applied. The arrangement comprises means for applying gelcoat to the interior surface of the mould (1) and a covering means (6) arranged to gradually cover the open mould (1) as gelcoat is applied.

9 Claims, 3 Drawing Sheets

(56) References Cited

U.S. PATENT DOCUMENTS

| | | | |
|---|---|---|---|
| 6,217,805 B1 * | 4/2001 | Brown et al. | 264/115 |
| 7,159,836 B2 * | 1/2007 | Parks et al. | 249/155 |
| 2005/0183813 A1 * | 8/2005 | Gonsalves et al. | 156/245 |
| 2008/0159871 A1 * | 7/2008 | Bech | 416/229 R |

* cited by examiner

METHOD OF APPLYING GELCOAT AND AN ARRANGEMENT PERFORMING SAID METHOD

CROSS REFERENCE TO RELATED APPLICATIONS

This is a U.S. National Phase patent application of PCT/EP2009/064994, filed Nov. 11, 2009, which claims priority to Danish Patent Application No. PA 2008 01564, filed Nov. 12, 2008, each of which is hereby incorporated by reference in the present disclosure in its entirety.

The present invention relates in general to a method of manufacturing fibre-reinforced parts for a wind power plant, such as blades, in an open mould. More specifically the invention relates to a process step of applying at least one layer of gelcoat on an interior surface of the open mould prior to arranging at least one layer of material comprising fibre and to an arrangement that can be used in performing said method.

BACKGROUND

In the context of manufacturing fibre-reinforced parts, such as blades for wind power plants, a manufacturing process is typically used wherein a part is moulded in sections, e.g. two halves, usually in open moulds. Later the sections are removed from there respective mould and joined together to form said part.

To prepare the mould, a coating, often referred to as gelcoat, is initially applied onto the interior surface of the open mould.

A gelcoat is a material used to provide a high quality finish on the visible surface of the finished part of a fibre-reinforced composite material. Gelcoats are applied to moulds in the liquid state. They are cured to form crosslinked polymers and are subsequently backed up with composite polymer matrices, often mixtures of polyester resin and fiberglass or epoxy resin with glass, kevlar and/or carbon fibres.

The manufactured component or section, when sufficiently cured and removed from the mould will present a gelcoated surface that is usually pigmented to provide a colored, glossy surface which improves the aesthetic appearance of the component.

When the gelcoat have been applied to the interior surface of the mould, it needs proximately one hour to cure. During that time, and during the application of the gelcoat, the gelcoat emits harmful vapours.

Because of the harmful vapours, a person applying gelcoat is usually feed with fresh air through a mask during the process.

Also the production hall needs to be extra ventilated to evacuate the vapours. This is usually done with expensive and large ventilation systems, which work at full capacity typically only a few hours per day, namely during the time when the gelcoat is applied and when it cures (approximately one hour from application). During this period of time no other production steps can be conducted in the production hall.

If two or more moulds are used the production needs to be coordinated with respect to the gelcoating process, so that valuable mould time is not wasted waiting for gelcoat to be applied in other moulds or ventilation of the production hall.

During the production steps following the application and curing of gelcoat, a number of layers of fibre material are arranged in the mould, typically by hand, and followed by a resin to attach the individual layers of fibre material to each other.

OBJECT AND SUMMARY OF THE INVENTION

There are a number of challenges facing this type of production, e.g. handle the need for ventilation in the production hall, the production planning, the need to be cost effective, etc.

Therefore, it is an object of the present invention to reduce or overcome one or more of the above mentioned challenges or drawbacks.

This is accomplished by the method of manufacturing a fibre-reinforced part as per the introductory part of this specification, wherein said process step of applying the gelcoat comprises;
  applying the gelcoat from a first end portion of the mould and to a second end portion of the mould,
  cover the open mould from said first en portion to said second end portion gradually as gelcoat have been applied.

This will reduce the direct emission of vapours from the gelcoat applied in the mould to the surrounding, e.g. the production hall.

In an alternative embodiment, a negative pressure can be created in the part of the mould that has been provided with gelcoat. This can e.g. be done by evacuating air from a space defined by the mould and the cover. This will dramatically reduce the spontaneous emission of vapours from the gelcoat to the surrounding.

In another embodiment the air can be evacuated from a position at one end of said space. This can create airflow through the space that effectively transports vapours away from the space. Further, air can be feed to said space from an inlet arranged at an opposite end of said space from where the air is evacuated. This can increase the control over the airflow in the space.

In a further embodiment, said air to be feed to the space can be heated to a temperature of or above 16 degrees Celsius. The heated air is to reduce the risk of condensation in the mould. Even higher temperatures can be used to accelerate the curing.

In another embodiment the cover can follow the progress of the gelcoat over the mould.

In another embodiment, the evacuation of air can be arranged at the first end portion of the mould and that the feed of air or gas can be arranged at the front edge of the cover to increase the control over the environment in the space.

In another embodiment, the gelcoat can be applied in a predetermined pattern, e.g. by means of a programmable robot. This can be used to secure quality and reduce the need for people working in this environment.

The inventive arrangement comprises covering means arranged to gradually cover the open mould as gelcoat is applied to its interior surface.

In an embodiment an air evacuation means can be arranged to evacuate air and vapours from a space defined by the mould and said covering means. The air evacuation means can be a fan or ventilation arrangement dimensioned by a man skilled in the art to achieve the described evacuation. A fan can be positioned next to the mould or at a central position and from there be able to serve more than one mould.

In another embodiment a carrier means can be arranged to controllably travel along the mould and carrying the means for applying gelcoat. Said means for applying gelcoat can be a seat or platform for a person that uses a hand held applicator or in still another embodiment the gelcoat application means can be a robot holding and handling the applicator.

In another embodiment, a control unit can be arranged to control the robot means and the carrier, thereby controlling the gelcoat application process.

In an embodiment a free end of the cover means can be physically attached to the carrier, and therefore it will extend after and follow the carriers movement over the mould.

In still another embodiment separately controlled power means can be arranged to control the covering means covering extension over the mould.

In another embodiment, the covering means can be an elongated flexible sheet provided with transversely extending stiffening elements to prevent the sheet from collapsing into the open mould.

In another embodiment, the covering means shows telescopic properties when shifting from a retracted state with the open mould exposed and to an extracted state covering the open mould.

In another embodiment the covering means can be arranged to be winded up on a coil in its retracted state and arranged to be unwinded to reach a extracted and covering state.

The present invention will be explained in more detail hereinafter on the basis of a detailed description of embodiments of the invention, which embodiments are meant solely by way of example. In the following detailed description, reference is made to the appended figures, in which:

DETAILED DESCRIPTION WITH REFERENCE TO THE FIGURES

Figure 1:
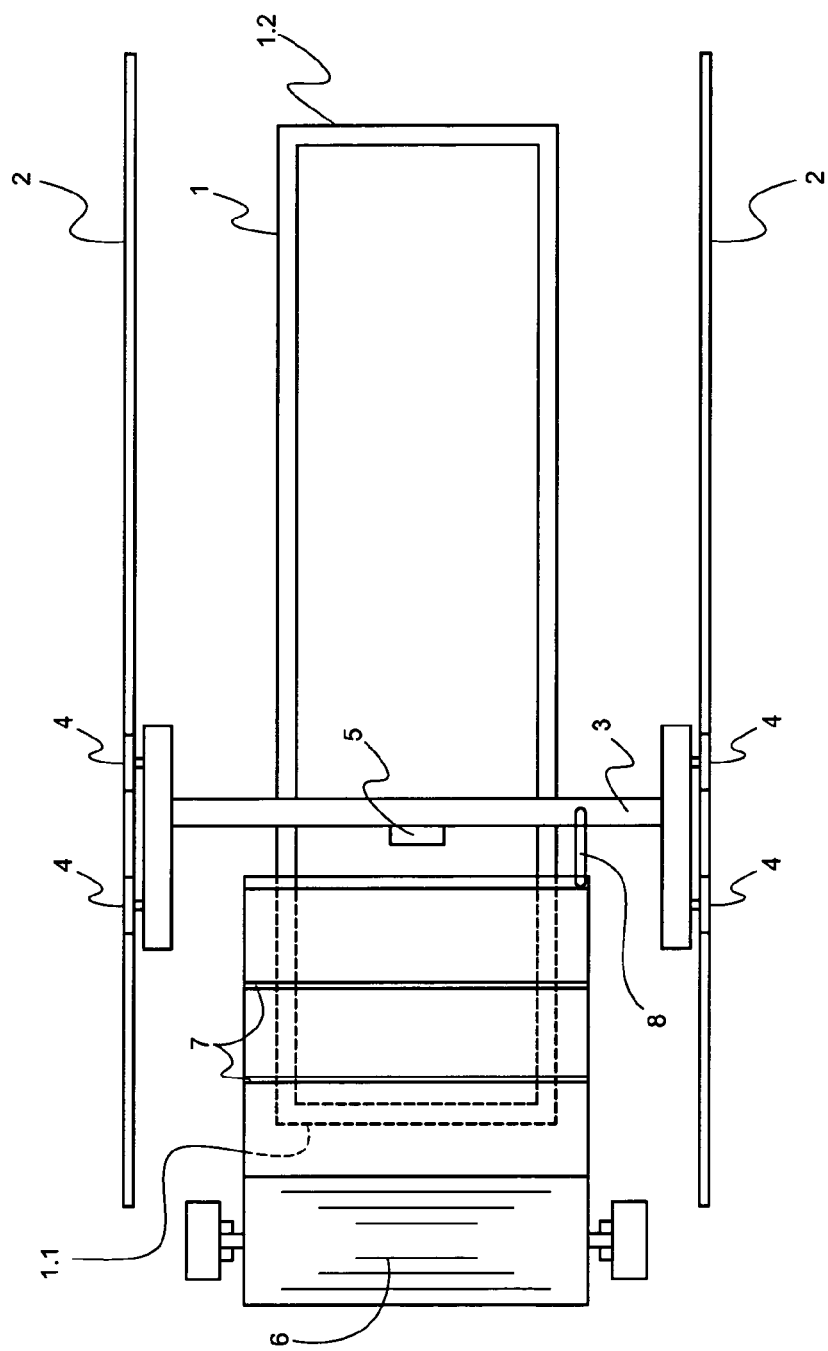
FIG. 1 schematically shows a top view of an open mould provided with an arrangement according to an embodiment of the present invention.
Figure 2:
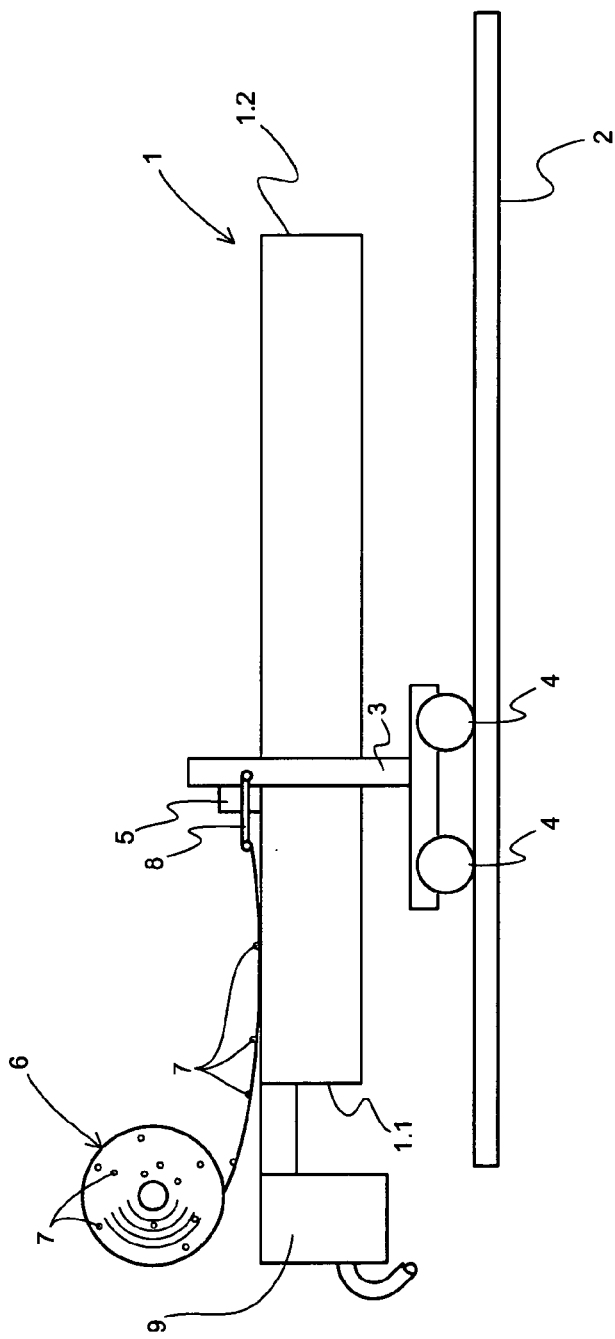
FIG. 2 schematically shows a side view of the embodiment according to FIG. 1

Now with reference to FIGS. 1 and 2, that schematically shows a top view and a side view respectively of an elongated open mould 1, having a length corresponding substantially to the length of the part or sub-part to be manufactured and being provided with an arrangement according to a first embodiment of the present invention.

Alongside the mould 1 and in the moulds longitudinal direction are arranged rails 2 or tracks on which a carrier 3 is arranged to travel. In this embodiment one rail 2 is arranged on the floor on each side of the mould 1.

The carrier 3 is a structure provided with wheels 4 that are complementary configured to fit and follow the rails 2. The carrier 3 structure is arrange to carry a robot means 5 arranged to apply gelcoat to the interior surface of the mould as the carrier 3 travels over the mould 1, from a first end of the mould 1.1 to a second end 1.2 of the mould 1. Hereby the need for personnel applying the gelcoat is reduced.

The carrier 3 also comprises a controllable driving means to facilitate its travel along the mould. The driving means is however not explicitly illustrated in the figures because how it is achieved is not core to this invention. Relevant is that the movement of the carrier can be controlled. However the driving means can e.g. comprise an electric, hydraulic, pneumatic or other type of controllable power.

The robot means 5 comprises a feed of gelcoat and means to control an outlet nozzle for the controlled application of gelcoat to the moulds interior.

Further a control unit is arranged to coordinate the robot means 5 and the carrier 3 to automatically facilitate the application of gelcoat.

At the first end 1.1 of the mould 1 there is arranged a covering means 6, here in the form of a roll of a flexible sheet material 6. The width of the sheet material is adapted to cover/spanning the width of the mould 1. To prevent the flexible sheet 6 from collapsing into the mould, the sheet is provided with transversely extending stiffening bars 7, arranged at intervals.

According to an embodiment of the present invention, the carrier 3 is positioned at the first end 1.1 of the mould 1 and is attached to the free end of the flexible sheet material 6 using attachment means here in the form of two links 8.

As the robot means 5 is activated to initiate application of gelcoat to the interior surface of the mould 1 at its first end 1.1, the carrier 3 will start travelling along the rails 2 at a speed adapted to the robot means 5 capacity of applying gelcoat. As the sheet 6 is attached to the carrier 3, the sheet 6 will be rolled out as the carrier 3 travels along the mould 1 and it will thus gradually and continually cover the mould 1.

This will reduce the amount of vapours emitted direct from the mould 1 to the production hall during application.

When the carrier 3 and the robot means 5 have travelled to the second end 1.2 of the mould and the gelcoat application have been finalized, the sheet 6 will cover the open mould 1 resting against the moulds 1 upper edges.

By arranging an air extraction arrangement 9 at the first end 1.1 of the mould 1 to suck out air and vapours from the space defined by the mould 1 and the sheet 6 (the defined space) from start, will radically lower the amount of vapours emitted from the mould to the production hall both during application and afterwards during curing. A centrally located fan is attached to the first end 1.1 of the mould via a channel system in the production hall. Preferably the extracted air is transported away from the production hall and treated.

Sucking out air and vapours from the defined space lead to the creation of a negative pressure in said defined space, which hinder vapours therein to escape out from the space in potential gaps between the sheet 6 and the edge of the mould 1, as surrounding air will be entering the space through such gaps driven by the pressure deferens. Until the mould have been completely covered, surrounding air will also enter through the remaining open mould in front of the cover, creating a flow of air through the space in a direction to the air extraction arrangement at the first end 1.1 of the mould thereby extracting the vapours directly from its source.

The term negative pressure is here used to describe a situation where the air pressure in a space is lower than the surrounding air pressure and thus create a flow of air from the surrounding to the space.

Figure 3:
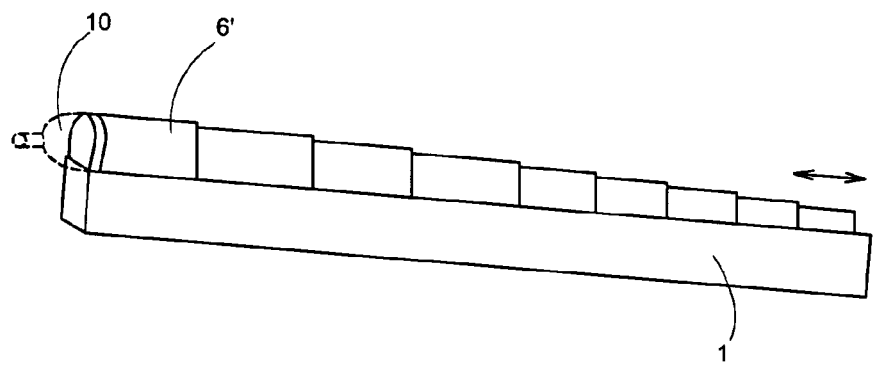
FIG. 3 schematically show a alternative cover embodiment

An alternative embodiment of the covering means 6 is schematically illustrated in FIG. 3, where the covering means is of a self-supporting telescopic type 6' and shown fully extending and covering the whole extension of the elongated mould. The telescopic parts are generally arc-shaped plates 6' in stepwise decreasing radius/dimensions and resting against the side edges of the mould or against gliding surfaces arranged along the moulds edges. The extension of the telescopic cover can be controlled by the carrier movement or by other suitable controllable power means.

A connection arrangement in the form of a dimension adjusting junction 10 is arranged to connect the largest arc-shaped plate to an air extraction arrangement 9. The largest arc-shaped plate is in the retracted position of the telescoping cover arranged to receive the other plates and arranged at the first end 1.1 of the mould 1.

Figure 4:
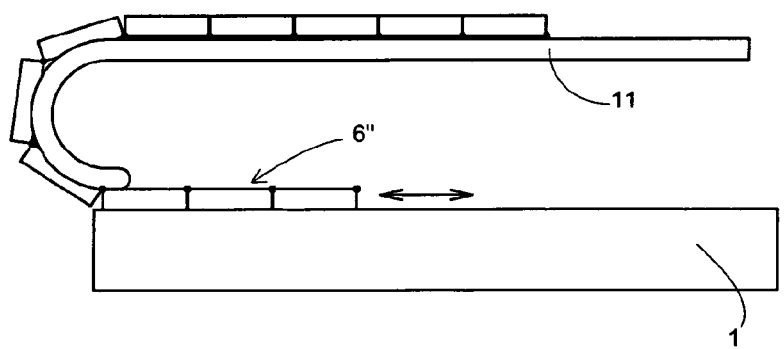
FIG. 4 schematically show a still further alternative cover embodiment

Yet another embodiment of the covering means 6 is schematically illustrated in FIG. 4, where the covering means is in the form of an array of plate units interconnected by pivoting joints to a chain of plates 6". In a retracted position, the chain of plates 6" is stored in a guide 11 that can be arranged to hold the chain of plates above and free of the mould. The free end of the chain of plates (the first plate) is attached to the carrier (not shown in FIG. 4), and as the carrier is travelling over the mould 1, the chain of plates 6" is gradually drawn out from the guide to cover the open mould. Also with this arrangement, an air extraction arrangement is preferably provided to extract air and vapours from the gradually growing defined space.

Alternatively, the chain of plates 6" can be arranged to be winded up on a coil in its retracted state and for subsequent unwinding and covering of the mould as it gradually is drawn over the open mould.

The covering means 6 can be controlled by the carrier 3 as previously described, or can in other embodiments be controlled by a separate controllable power means, such as e.g. pneumatic, hydraulic, electric, or other controllable power means.

In the case where the covering means is separately controlled, the frontline of the cover 6 can be controlled in relation to the frontline of the gelcoat. Hereby e.g. it will be possible to drive the cover frontline ahead of the gelcoat frontline and thus provide a better catch of vapours from the gelcoat during application and when approaching the end 1.2 of the mould 1, break the covers travel to allow the robot means 5 to finish the gelcoat application and withdraw from the mould 1 before the cover progress the final distance to close the open mould.

Even thought the air extraction arrangement 9 above have been explained as being positioned at the first end 1.1 of the mould, it can have other positions and e.g. be positioned at the carrier 3, whereby at least one inlet opening preferably is arranged at the first end 1.1 to facilitate a flow of air through the defined space.

In other embodiments the air to enter the space is tempered, e.g. to be above 16° C. to reduce the risk of condensation and more preferably above 20° C. and most preferably above 25° C., to accelerate the curing.

The invention claimed is:

1. A method of manufacturing fibre-reinforced parts for a wind power plant in an open mould, said method comprises a process step of applying at least one layer of gelcoat on a curved interior surface of said open mould prior to arranging at least one layer of material comprising fibre and characterized in that said process step of applying the gelcoat comprises:
applying the gelcoat from a first end portion of the mould and to a second end portion of the open mould,
covering the open mould from said first end portion to said second end portion gradually with a cover selected from the group consisting of a flexible sheet cover, a telescopic cover and a chain of plates, as gelcoat is applied, and prior to arranging the at least one layer of material comprising fiber.

2. A method according to claim 1, characterized in arranging a negative pressure in the part of the open mould that has been provided with gelcoat, by evacuating air from a space defined by the open mould and the cover.

3. A method according to claim 2, characterized in that the evacuation of air is conducted at the first end portion of the mould and that a feed of air or gas is conducted at a front edge of the cover.

4. A method according to claim 2, characterized in that the air is evacuated from a position at one end of said space.

5. A method according to claim 4, characterized in that air is feed to said space from an inlet arranged at an opposite end of said space from where the air is evacuated.

6. A method according to claim 5, characterized in that said air to be feed is heated to a temperature of or above 16 degrees Celsius.

7. A method according to claim 1, characterized in that the cover follows the progress of the gelcoat over the mould.

8. A method according to claim 1, characterized in that the gelcoat is applied in a predetermined pattern.

9. A method of manufacturing fibre-reinforced parts for a wind power plant in an open mould, said method comprises a process step of applying at least one layer of gelcoat on a curved interior surface of said open mould prior to arranging at least one layer of material comprising fibre and characterized in that said process step of applying the gelcoat comprises:
applying the gelcoat from a first end portion of the open mould to a second end portion of the open mould,
covering the open mould from said first end portion to said second end portion gradually and simultaneously with a cover as gelcoat is applied and prior to arranging the at least one layer of material comprising fiber to prevent gases emitted from the gelcoat out from the open mould.

* * * * *